US008414058B2

(12) United States Patent
Duffy

(10) Patent No.: US 8,414,058 B2
(45) Date of Patent: Apr. 9, 2013

(54) MOTOR-DRIVEN MODULAR TRUNK HINGE

(75) Inventor: Michael John Duffy, Midland (CA)

(73) Assignee: M&C Corporation, Sterling Heights, MI (US)

( * ) Notice: Subject to any disclaimer, the term of this patent is extended or adjusted under 35 U.S.C. 154(b) by 419 days.

(21) Appl. No.: 12/752,579

(22) Filed: Apr. 1, 2010

(65) Prior Publication Data

US 2010/0251519 A1 Oct. 7, 2010

Related U.S. Application Data

(60) Provisional application No. 61/166,549, filed on Apr. 3, 2009.

(51) Int. Cl.
*B62D 25/12* (2006.01)

(52) U.S. Cl. .......................................... 296/76; 49/349

(58) Field of Classification Search .................... 16/304; 296/76, 146.11, 56; 49/349
See application file for complete search history.

(56) References Cited

U.S. PATENT DOCUMENTS 2,967,325 A 1/1961 Herzfeld
3,024,488 A 3/1962 Germann
4,739,585 A * 4/1988 Pickles .......................... 49/280
6,425,205 B2 7/2002 Wygle et al.
6,789,834 B2 9/2004 Schlegel
7,069,695 B2 7/2006 Hattori et al.
7,140,150 B2 11/2006 Sakai et al.
7,293,819 B2 11/2007 Duffy
7,350,845 B1 4/2008 Duffy
7,730,584 B2 6/2010 Duffy
2003/0038500 A1 * 2/2003 Aubry et al. .................... 296/76

OTHER PUBLICATIONS http://www.valeo.com/automotive-supplier/Jahia/pid/968, Valeo Trunk Power Closure System, Comfort Enhancement, Jul. 24, 2007, pp. 1-13.

* cited by examiner

*Primary Examiner* — Glenn Dayoan
*Assistant Examiner* — Pinel Romain
(74) *Attorney, Agent, or Firm* — Brooks Kushman P.C.

(57) ABSTRACT

A vehicle hinge set for supporting and operating decklid closures on a vehicle include at least one primary unit, at least one secondary drive unit slidably receivable against a primary unit, and a mount for supporting the aligned primary and secondary units. The primary unit combines a decklid strap pivotably connected to the primary unit, and may include a biasing mechanism. The secondary unit is mechanically and electrically coupled for motorized displacement of the strap of the primary unit.

18 Claims, 5 Drawing Sheets

MOTOR-DRIVEN MODULAR TRUNK HINGE

CROSS-REFERENCE TO RELATED APPLICATION

This application claims the benefit of U.S. provisional Application No. 61/166,549 filed Apr. 3, 2009, the disclosure of which is incorporated in its entirety by reference herein.

BACKGROUND OF THE INVENTION

1. Field of the Invention

The invention relates to hinges for mounting motor vehicle decklid closures with at least one power assisted hinge set adapted for preassembly by simple modular integration with production installation of a primary hinge unit and secondary, selectively separable drive unit.

SUMMARY OF THE INVENTION

The present invention provides a hinge system whose embodiments may provide a cost-effective option for automating a previously known modular hinge. Each hinge set may be installed or removable as at least one integral unit. Each integral unit may be installed in and may be able to fit in numerous or a wide variety of vehicles with minimal tailoring to provide modularity and standardization. The embodiments permit changes to be included in each integral unit that do not interfere with allowing fast and non-strenuous installation of at least a primary unit portion of the hinge unit onto the vehicle body. The integral unit may also provide for simple production installation of a drive, or secondary unit, onto a mounted primary hinge unit. The engagement of the drive unit to the primary unit may be joined directly to the hinge set's pivot support, and may be installed after motor vehicle production paint processing in the assembly plant covers the primary unit.

Installed hinge set embodiments may be supplemented with actuators that allow the user to open and close the car trunk by remote activation or by manual latch disengagement such as key fob, voice recognition, cell-based communication or alternatives. As a convenience feature, such combination enables the invention embodiments to allow convenient, hands-free access to car trunk so that the user can lift in or out heavy or cumbersome items.

The embodiments of the invention may include a primary unit constructed according to U.S. patent application Ser. No. 11/446,857, filed Jun. 5, 2006, for a modular hinge, incorporated herein by reference, that may form a part of at least one of the hinge sets for the decklid. In addition, a drive unit with a coupler selectively engages a motor drive unit on a primary hinge unit. A primary unit may be one of a pair of hinge sets that are often used to support a trunk lid in production motor vehicles and a secondary unit is adapted to be received by simple displacement to engage the primary unit for mounting it integrally with the primary unit.

A control system for the unit may be activated by key fob, voice recognition or other remote activation devices. The primary or hinge unit and the secondary or drive unit may be installed and adjusted in minutes, easily and without unintentional releases of the biasing forces. The primary unit may incorporate a biasing mechanism, for example, where the embodiment preferably uses integral coiled spring assist in the primary unit, and may reduce the need for secondary units on each hinge set installed on a vehicle, and may be limited to one hinge set of the hinge. Prior to vehicle production assembly plant paint processing, the primary hinge units may be installed without the drive unit. The drive unit may include an electric motor, drive transmission, and associated control circuitry attached. An embodiment may include an output shaft for displacing the strap with the aid of a track on the secondary unit. For example, the motor may drive a pinion engaged with a rack on the secondary unit, so that the secondary unit simply engages but accurately controls displacement of the primary unit's lever. The drive unit control may be plugged into the vehicle's electronic power control system via a harness coupling or other connector.

The preferred embodiments of the invention may be of a more simple construction than prior art devices as the output of the drive unit may be guided and supported directly by the pivot axis support of the primary hinge unit, and simply positioned for direct engagement with a moveable member of the primary hinge set. Because the primary units may include spring-loaded biasing to counterbalance the decklid mass, the motor output and the physical size may be minimized. Speed, positioning, opening and closing performance of the decklid may be controlled by an electronic control system providing signals in a known manner to the motor, while features of the integral relation between primary and secondary units control pivoting movement of the decklid as desired.

In the event of a dead battery or other electrical malfunction, the trunk may be opened by the use of a conventional key-cylinder system that opens the latch, and either permits the motor to be over-ridden by the use of an integral torque limiting mechanism, or removed from engagement, to simplify movement of the trunk lid or protect the motor, transmission or other components from damage in a no-power situation.

The following drawing figures show embodiments of the construction of the motor-powered hinge for a vehicle trunk using embodiments of primary units and an embodiment of a secondary unit according to the invention. A hinge support bracket may be attached to the rear package shelf of the vehicle for reduced obstruction of the trunk compartment. The secondary unit may be anchored to the hinge bracket of a primary unit by the same support structure, such as studs protruding from the hinge bracket, or by other structure that may duplicate the attachment of the primary unit to the body structure. A side plate of the hinge bracket may hold the pivot for the strap that is attached to the decklid undersurface. In an illustrated embodiment, a track on the secondary unit, for example, a rack and pinion mechanism, couples the primary unit and secondary unit for displacing the strap about its pivot. An alternative coupling includes a C-shaped coupling that straddles the strap and positioned in alignment with the pivot axis for controlling displacement about the pivot axis.

The primary unit shown may be installed quickly, easily and without excess torsion forces affecting positioning or mounting in the vehicle. The mounting may be performed prior to conventional vehicle production paint processing. The embodiments of primary units and secondary units may be tailored to more than one vehicle environment, avoiding the conventional torque rod installation that is laborious and may impose forces unintentionally applied to ambient personnel and equipment. A secondary or drive unit may be installed quickly and easily to at least one of the hinge sets formed by a primary unit but preferably after paint processing, and provides connectors for electrical coupling such as plug and socket harness connectors, into the vehicle's control system. Prior designs proposed for integrating motor and hinge units do not easily allow separate or simple motor attachment, particularly after the primary hinge unit is installed in the vehicle. The embodiments may provide simpler construction compared to prior art hinge systems, that may not readily adapt to configured driven mechanisms. Prototypes of the illustrated embodiment substantially reduce difficulty of assembly and reduce the time to install. For example, the entire prototype system shown can be installed in 2-3 minutes under normal production conditions.

BRIEF DESCRIPTION OF THE DRAWINGS

The present invention will be more clearly understood by reference to the following detailed description of a preferred embodiment in which like reference characters refer to like parts throughout the views, and in which.

DETAILED DESCRIPTION OF A PREFERRED EMBODIMENT

Figure 1:
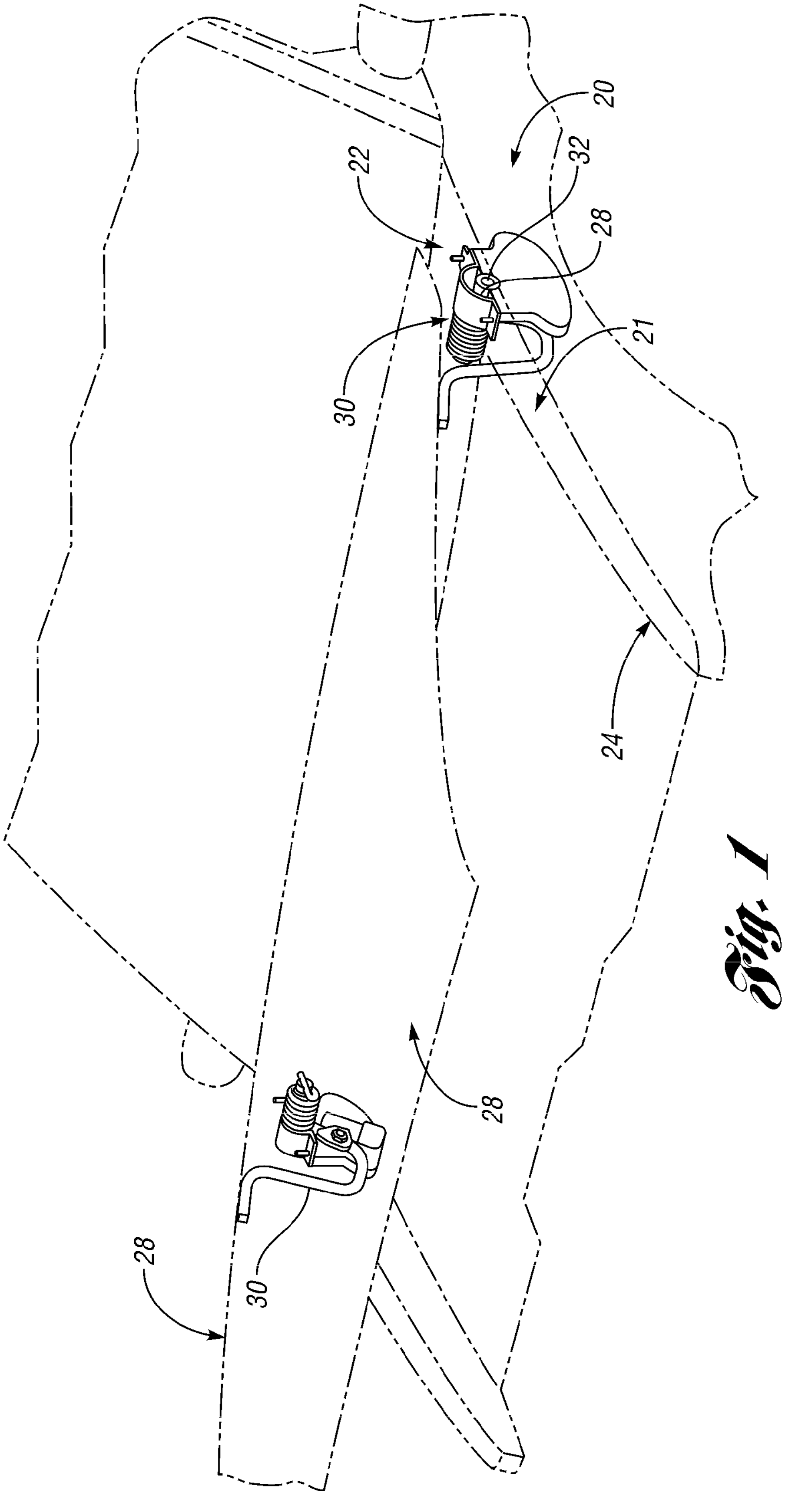
FIG. 1 is a perspective view of a motor vehicle body whose decklid is displaced by a hinge comprising two hinge sets, each hinge set having a primary unit, and at least one hinge set having a motor driven secondary unit, according to the invention.

Referring first to FIG. 1, vehicle body 20, a portion of which includes a structural shelf 22 or other portion that may be used for structural reinforcement or partitioning adjacent the cavity 24 such as a trunk or engine compartment. The cavity 24 may be covered by a lid 28 pivotally supported with respect to the shelf 22 by means of at least one hinge set 30. Preferably, a pair of hinge sets 30 form the body hinge 33 for the closure or lid 28, although more may also be provided without departing from the invention.

In the preferred embodiment, each of the hinge sets 30 includes a primary unit 38 in which a strap 32 is pivotally secured with respect to a hinge housing 34 adapted to be secured to the shelf 22. In an embodiment as shown where the shelf 22 is adjacent the opening for the cavity 24 in the body 20, the strap 32 may be in the form of a gooseneck bar having a curved portion that displaces the trunk away from the peripheral confines of the trunk to avoid interference between the closure 28 and adjacent body portions 21 during movement of the closure.

Figure 2:
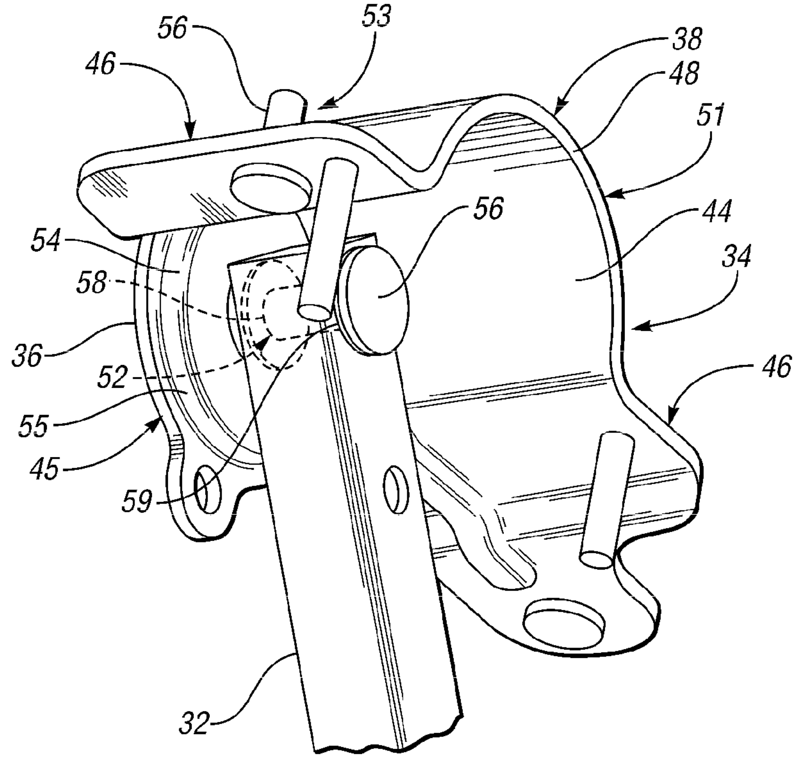
FIG. 2 is an enlarged, broken perspective view of a primary unit of a hinge set illustrated in FIG. 1 with portions removed for the sake of clarity.

As best shown in FIG. 2, the hinge housing 34 of this embodiment of a primary unit 38 is provided in the form of an attachment bracket 44. The strap 32 is held by a pivot connection 36 to the attachment bracket 44 to form an embodiment of a primary unit 38 of the hinge set 30. As shown in FIG. 1, a pair of primary units 38 may be spaced apart along the shelf structure of the vehicle body. However, the number of primary units employed may be varied as desired and details of constructing each hinge set may vary without departing from the invention as claimed. In addition, as shown in FIG. 3, the primary unit 38 may include a biasing spring mechanism 42 described in greater detail below to form a biased hinge set 40.

Figure 3:
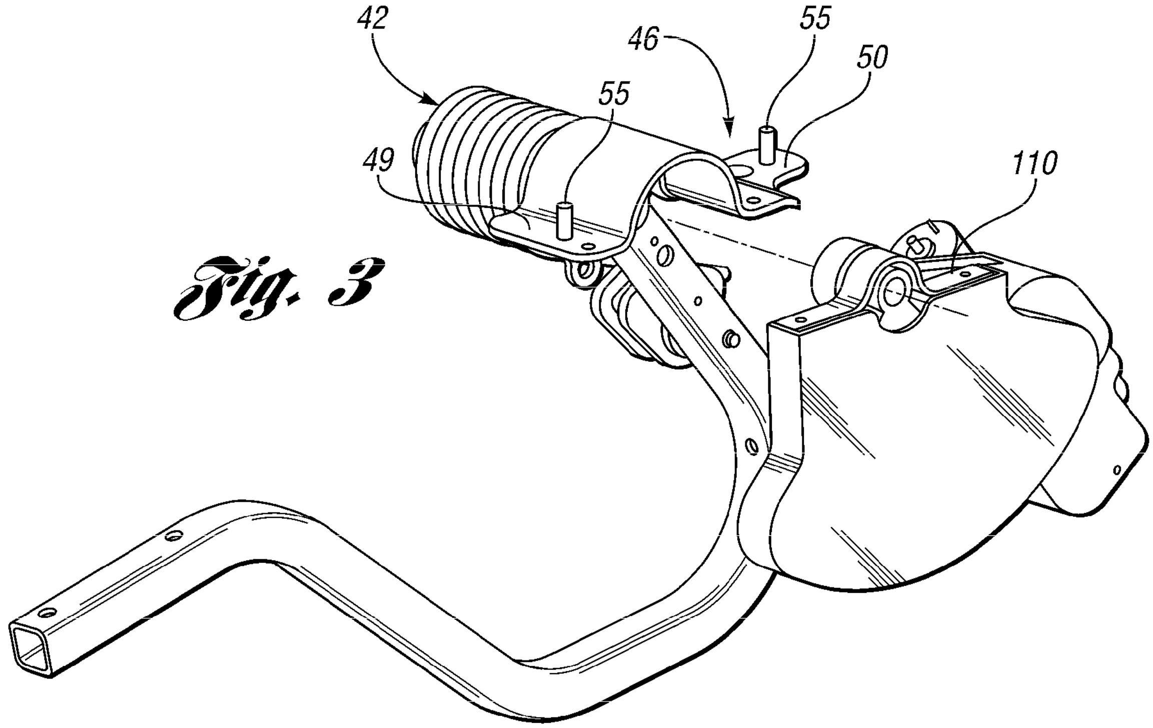
FIG. 3 is an exploded perspective view of a primary unit as shown in FIG. 2 allowing for joinder with a secondary unit according to an illustrated embodiment of the present invention.

Referring now to FIG. 3, a secondary or drive unit 100 may be joined to the primary unit 38. A secondary unit 100 may be attached to each primary unit 38 installed in the vehicle. Nevertheless, the secondary unit 100 may also be employed only at selected hinge sets 30 forming a vehicle hinge 33 (FIG. 1). However, at least one hinge set 30 of each hinge 33 may be provided with a secondary unit 100 for each hinge set 30 without departing from the scope and spirit of the present invention.

In the preferred embodiment, each primary unit 38 is carried by a support bracket 44 (FIG. 2) having a mount 46 (FIG. 2) for securing the hinge set to the peripheral body structure 21, for example, the shelf 22 (FIG. 1). In the preferred embodiment, the mount 46 comprises separated lands 49 and 50 (FIG. 3) formed to engage and be fastened securely to corresponding lands on the peripheral body structure 21 (FIG. 1). For example, as shown in FIG. 2, a stamping 51 may be configured to adjoin or be formed with a wall 48 of the bracket 44 (FIG. 2). The stamping is adapted to mate with surface portions of the peripheral body structure 21 and be retained, for example, by fasteners 55. In the illustrated embodiment, the lands include openings adapted to receive fasteners, such as bolts 55, that are received through openings in the mount 46 of bracket 34 and aligned openings in the mating portions of the peripheral body structure 26. The bracket 34 may include structural changes without departing from the invention.

In addition, the bracket 44 is shown with a side plate 45 forming a support wall (FIG. 2) that carries a pivot pin 52 (FIG. 2) in a cantilevered manner by protrusion 54 extending from one surface of the side plate 45 of the bracket 44.

In the illustrated embodiment, the pivot 36 (FIG. 2) may include a pivot pin 52 with an enlarged head 56, and a shank 58 (FIG. 2) extending through the aligned openings in walls of a tubular member forming the strap 32. The shank 58 may be retained in bushings 35 and 37 carried in appropriately sized openings in walls of the strap 32 to permit the strap 32 to pivot about the axis of a pivot pin 52. The pivot pin 52 of the preferred embodiment includes a shank 58 (FIG. 2) that may terminate in a shoulder 62 (FIG. 2), from which the terminal end portion 64 of the shank extends. For assembly, the end 64 extends through an opening 57 in the side plate 45. The shoulder 62 engages a surface or wear plate 63 at the side plate 45 and a protruding portion of the end 64 may then be peened or otherwise retained, as shown in phantom line at 66 in FIG. 2, against the opposite side or surface of the side plate 45.

Similarly, the illustrated embodiment of the primary unit 30 includes biasing mechanism 42. The side plate 45 of bracket 44 carries a retainer bar 74 (FIG. 6) cantilevered to extend outwardly from a surface of the side plate 45 opposite the pivot pin 52. Preferably, as shown in the illustrated embodiment, the pivot pin 52 and the retainer bar 74 may be positioned coaxially to reduce connections and size, but extend from opposite faces of the side plate 45 in a fixed packaging footprint that does not change despite revisions to the biasing force or decklid structure being supported by the hinge 33. Structural changes to the attachment of the pivot pin 52 or the retainer bar 74 may be made without departing from the invention. For example, the bar 74 may be formed by a hollow tube that lowers the weight but provides torsional stiffness. In an illustrated embodiment, the tube includes at least one shoulder 77 (FIG. 6) that rests against a surface of the side plate 45, while providing at least one protrusion 78 that extends through an aperture 88 in the side plate 45 and is peened or otherwise retained or secured against the opposite side surface of the side plate 45. A plurality of such protrusions and openings may be employed. However, construction and attachment of the retainer may vary without departing from the invention.

Figure 6:
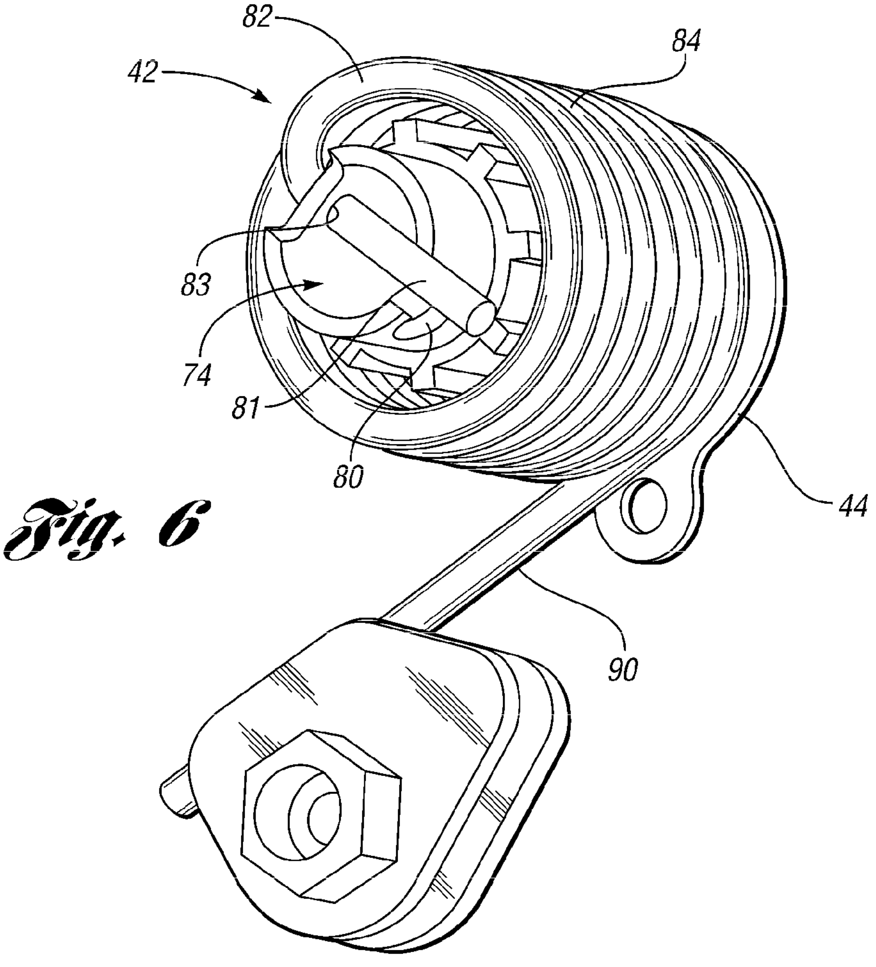
FIG. 6 is an enlarged perspective view of a biasing mechanism employed in a primary unit shown in FIGS. 3 and 4.

As best shown in FIG. 6, an embodiment of the biasing mechanism 42 may include the retainer bar 74 having a recess 80 (FIG. 6) that receives a terminal end portion 81 of a spring strand 82. The strand 82 is helically coiled laterally at a coiled portion 84 (FIG. 6). The coiled portion 84 is received over and extends along the retainer bar 74. In the preferred embodiment, the recess 80 is in the form of a pair of bores 83 on diametrically opposed tube walls of bar 74. However, an open recess 80 or other connector could also be employed, so long as a strand end 81 may be received for fixing the end against rotation by the retainer bar 74 so as to lock the coiled spring's strand end 81 to the retainer bar 74. A strand end portion 90 (FIG. 6) extends radially from the other end of the coil portion 84 for engagement with a retainer on the strap 32. In the preferred embodiment, the retainer is a receiver 92 attached to the strap 32 as discussed below, although structural changes may be made without departing from the invention.

The coiled spring 80 of the biasing mechanism 42 (FIG. 3) is selected depending upon the spring force required as a function of the mass of the body panel forming the decklid, the center of gravity of the decklid and performance specifications of the decklid assembly and hinge linkages. An end 90 of the spring 80 adjacent an end of the coiled portion 84 engages a receiver 92. In the illustrated embodiment, the receiver 92 may be an adjuster 66, for example, a multiple surface cam body mounted to the strap 32 as previously described in U.S. Pat. No. 7,350,845 B1, incorporated entirely herein by reference. The tailoring of the coil spring to the vehicle may be designed in by varying the number of coils, the diameter of the coils, the wire diameter of the strand, the prewind as well as an adjustment that may be made available at an adjuster 66. The mean coil diameter may also be varied in this design, and structural changes may be made to the strand ends and their positions relative to the coiled portion 84 without departing from the invention. Structural changes may be made to the receiver without departing from the invention.

Figure 5:
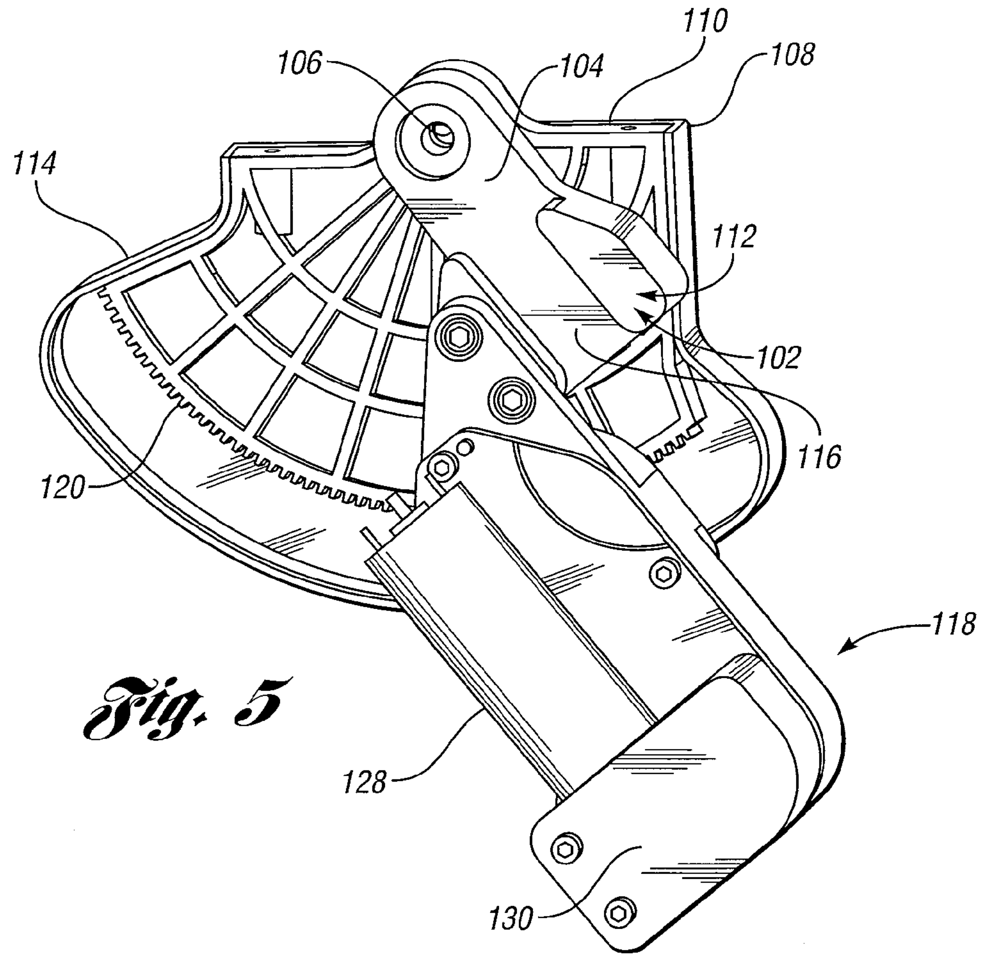
FIG. 5 is a rear perspective view of the secondary unit shown in FIGS. 3 and 4.

As best shown in FIG. 5, the secondary or drive unit 100 includes a coupler 102. As shown in the illustrated embodiment, the coupler 102 may be adapted to be slidably received over at least a portion of the strap 32 carried by the primary unit 38 for drivably engaging the strap 32 for displacement of the strap with respect to the axis of the pivot 36. As shown in FIG. 5, the coupler may include a guide bar 104 pivotally secured by a pivot 106 to a secondary unit support plate 108 forming a drive mount. The support plate 108 positions the secondary drive unit 100 for coaxial alignment of the axes of pivots 106 and 36 of the secondary and primary unit embodiments, respectively. In this embodiment, the units are carried by the mount 46 of the primary unit 38, but structural changes may be made to each unit without departing from the invention.

Construction of the primary unit 38 and secondary unit 100 may be modified without departing from the invention so long as the secondary unit is made compatible with the primary unit such that it mounts adjacent to and operatively engages the primary unit so as to control movement of the strap 32 about the pivot 36. For example, a previously known hinge construction of U.S. Pat. No. 5,664,289, the adjustable decklid hinge of U.S. Pat. No. 5,967,586, or the modular hinge of U.S. Pat. No. 7,350,845 may be used as a primary unit 38 without departing from the invention, and are incorporated by reference.

Figure 4:
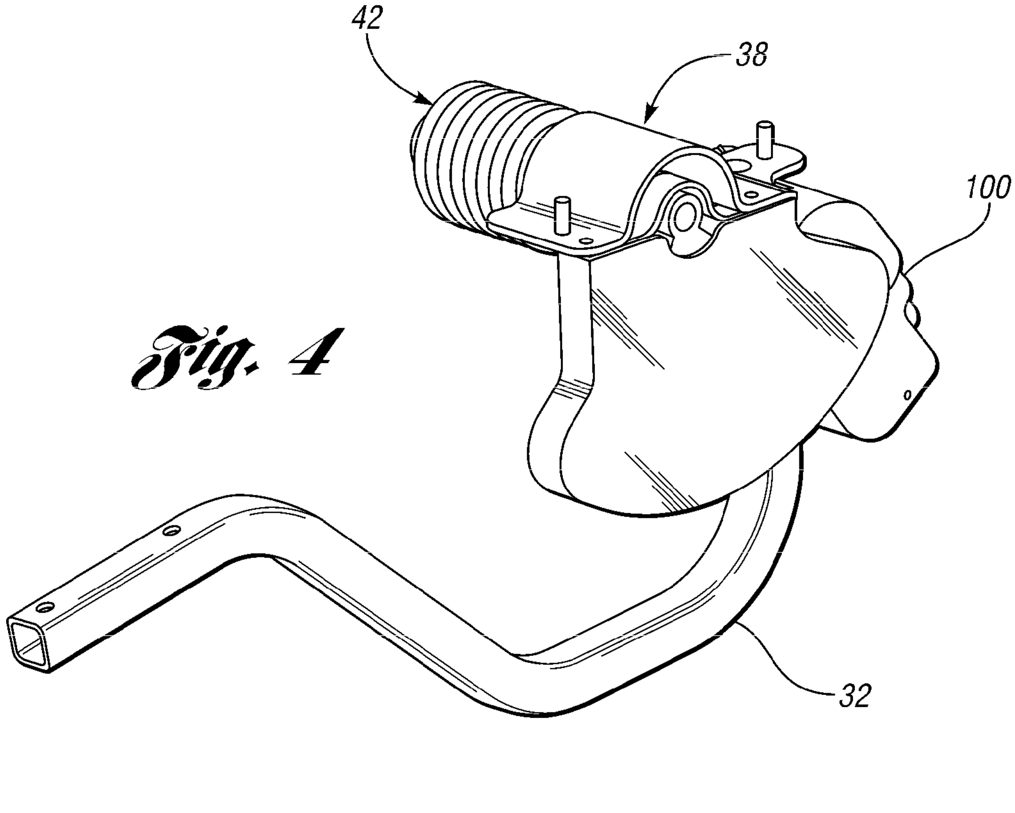
FIG. 4 is a perspective view of the primary and secondary unit shown in FIG. 3 joined.

As shown in FIGS. 3 and 4, the support plate 108 may include a mounting flange 110 that may be bolted or otherwise secured to the mount 46 for example, at mounting plate flanges 49 and 50 directly adjacent the strap 32 carried by the pivot 36 of the primary unit 38. In the illustrated embodiment, aligned apertures on the mounting plate 110 are aligned with apertures in the mounting plate flanges 49 and 50 of the primary unit. The bolts 55 inserted through the aligned apertures may also be engaged by nuts, weld nuts or the like associated with the shelf to fasten the mount supporting the primary and secondary units to the body support structure. Structural differences may be incorporated without departing from the claimed invention.

Figure 7:
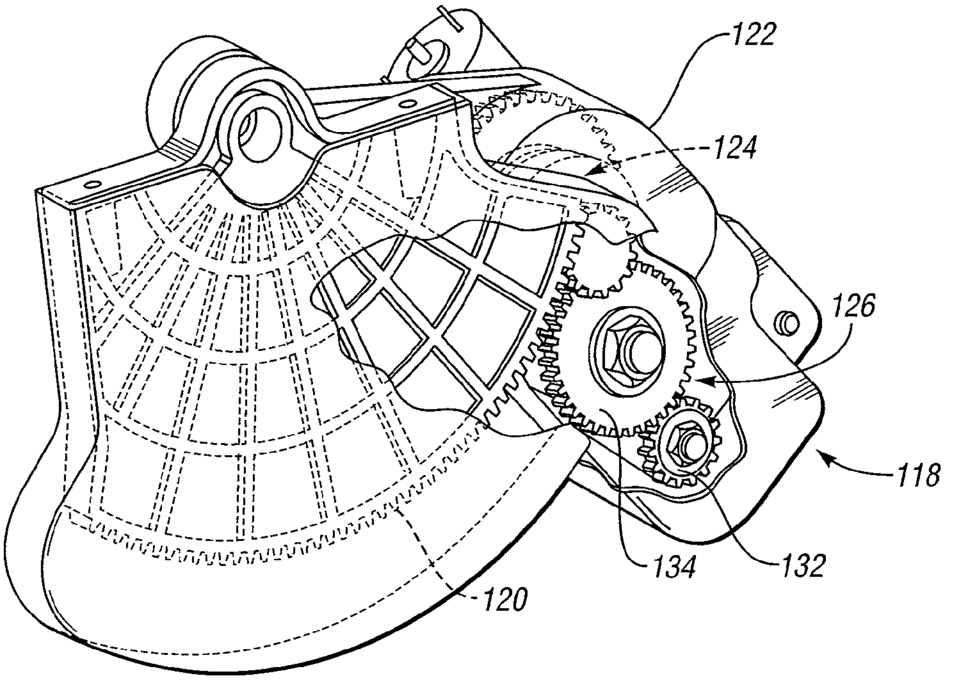
FIG. 7 is a perspective view of the secondary unit shown in FIGS. 3 and 4 with parts exposed for the sake of clarity.

As also shown in FIG. 5, a pair of support walls 112 and 114 are spaced on the arm 104. The wall 114, forming a gear box mount, and the wall 112 define a cavity 116 dimensioned to slidably receive the strap 32 as the secondary unit moves toward the primary unit, as the secondary unit 100 is slidably received over the strap 32 from the position shown in FIG. 3, to the position shown in FIG. 4. One of the support walls 114 carries a drive assembly 118 with a motor 128, clutch 124 (FIG. 7) and transmission 126 (FIG. 7). The transmission's output is a pinion gear 122 aligned for engagement with a track 120 carried by the support plate 108 in the illustrated embodiment: The track 120 is a radially arched, toothed rack, formed on the plate 108. The arm 104 rotates about the axis 106 along the path defined by the track 120. The drive pinion 122 exposed from a drive housing 123 (FIG. 7) engages the arcuate track 120 as shown in FIG. 7. In addition, an internal electromagnetic clutch 124 provides a source of selectable engagement between the drive pinion 122 and the transmission 126.

In the illustrated embodiment, the transmission 126 comprises a sequence of gears providing greater torque application to the pinion 122 than may be delivered from a drive unit power source such as the motor 128. The motor 128 may be selected as necessary for the power requirements designed to work with the transmission. The motor housing exposes connectors 154 for electrically coupling the motor to an electric supply and control system 156 in the vehicle. The electrical supply may apply voltage to the motor by switching in response to engagement of a key in a lock cylinder, or remote control actuation, or other actuator signaling an operator's desire to open the decklid. The control system 156 may also serve to operate the decklid in both opening and closing displacement as desired.

Figure 8:
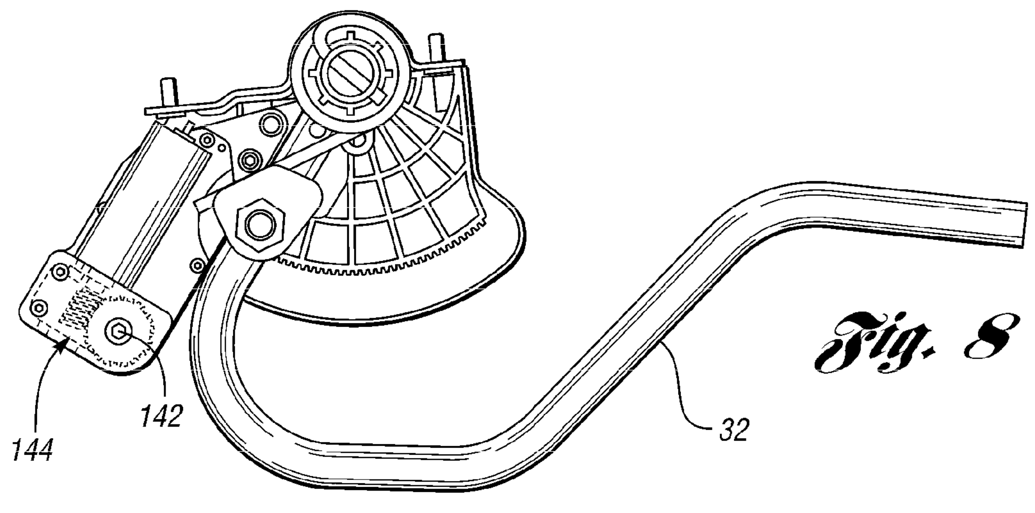
FIG. 8 is an elevational view of the combined primary and secondary units of the preferred embodiment showing their relative alignment in the closed position of the decklid.
Figure 9:
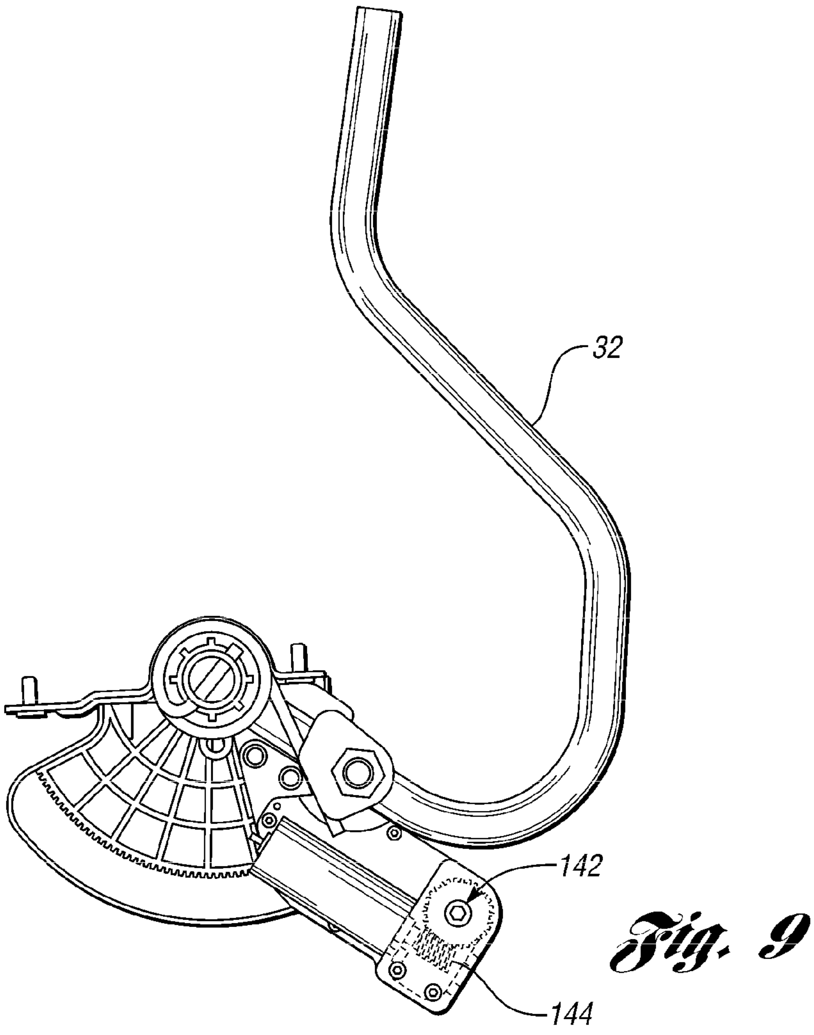
FIG. 9 is a side elevational view similar to FIG. 7 but showing the hinge in the open position of the decklid closure.

The transmission embodiment shown has a gear 135 that may be axially displaced by the clutch 124 to engage the gear 134. The gear 134 is on a shaft that carries a gear 133. In turn, the gear 133 engages the smaller gear 132 carried by a shaft for rotation with an output gear 142 of a drive mechanism 141 (FIG. 8) within the housing 130 (FIG. 5). The motor 128 may be housed for outputting rotary motion to a worm gear 144 engaged with a gear 142 that in turn is coupled to the shaft carrying gear 132 in transmission 126. Accordingly, the pinion 122 is driven along the track 120 about pivot 106 to provide displacement of the guide bar 104, whereby the guidebar's engagement with the strap 32 causes corresponding coaxial displacement of the strap 32 about its pivot 36 while engaged by the secondary unit 100. Nevertheless, structures, power source, drive ratios and other motive sources may be employed to practice the invention.

Preferably, the lever 32 has a gooseneck shape, often referred to as a gooseneck strap, to avoid interference between the decklid 28 and the peripheral body structure 26 in the displacement path between the open and closed positions of the hood 28. The shape or structure of the strap may change without departing from the present invention. The hinge strap may be specific to the vehicle, and tailored to its specific environment, or it may fit a wide variety of conventional models. In the illustrated embodiment, the strap 32 is a strap comprised of a bent tube that connects the decklid 28 for movement about the axis of pivot pin 52 as the biasing mechanism 42 urges the lid toward the open position, and may be employed to maintain the raised position with respect to the closed decklid position, although other structures do not depart from the present invention.

As a result, the present disclosure provides a decklid hinge for displacably supporting a decklid to and between open and closed positions over an opening defined by peripheral vehicle body structure during and after movement between the positions. At least one hinge set, although a pair of spaced hinge sets may be employed for stability in the illustrated embodiment for a vehicle decklid, may comprise a primary unit. A preferred embodiment of a primary unit comprises a support bracket with a mount for securing said bracket to the peripheral vehicle body structure; a pivot pin carried cantilevered by said support bracket, at one end of said pivot pin; and a linkage having a lever pivoted on said pivot pin, wherein said lever may be a strap to be joined to the lid.

The decklid hinge may be improved by said primary unit including a biasing drive, preferably carried on a support wall of the primary unit, for ease of installation. The biasing drive may include a retainer bar carried cantilevered by the support bracket at one end of said retainer bar; and a spring with a helically coiled strand portion, the laterally coiled portion receiving said retainer bar within, and the retainer bar retaining a first strand end of the spring.

A drive unit interconnectable to the primary unit comprises a drive mount, a coupler and a driver for controlling displacement of the coupler. The coupler slidably receives a portion of the lever at a position spaced from the pivot axis of the primary unit, that is aligned coaxially with the displacement path of the coupler. The drive mount engages the primary unit or the support structure carrying the primary unit for maintaining the coupler in engagement with the lever of the primary unit.

The disclosure also supports methods for modularizing a vehicle decklid hinge by installing a pair of hinge sets to a peripheral body structure defining an opening covered by the hood. The method comprises installing a primary unit having a mount including a support bracket engageable with the peripheral body structure, the support bracket also carrying a pivot pin cantilevered on said support bracket, and a lever pivotally mounted to the support bracket. The primary unit may include a biasing mechanism for lever pivoted on said pivot pin, including a helically coiled strand, for biasing the strand to a supported position. A method may include installing a secondary or drive unit having a support for aligning a second pivot coaxial to the pivot pin of the primary unit, a coupler engaging the lever for rotation about the second pivot, and a drive mechanism for displacing the coupler coaxially about said pin and the second pivot. The drive mechanism may include a track or guide.

Having thus described important structural features of an embodiment of the present invention, it is to be understood that the invention is not so limited, and is to be understood that variations of the details implementing embodiments of the invention do not depart from the scope and spirit of the present invention as defined in the claims.

What is claimed is:

1. A decklid hinge for displacably supporting a decklid to and between open and closed positions over an opening defined by peripheral vehicle body structure during and after movement between the positions comprises:

at least one hinge set, each said hinge set comprising a primary unit including;

a support bracket with a mount for securing said bracket to the peripheral vehicle body structure;

a pivot pin carried cantilevered by said support bracket, at one end of said pivot pin; and a linkage having a lever pivoted on said pivot pin and adapted to carry the decklid to and between said open and closed positions, and further comprising a drive unit with a drive mount having a support plate with a second pivot having a second pivot axis and positioning the drive unit with coaxial alignment of said first and second pivots interconnectable to the primary unit.

2. The invention as described in claim 1, wherein said at least one hinge set comprises a pair of spaced hinge sets.

3. The invention as described in claim 1, wherein said lever is a strap secured to the lid.

4. The invention as described in claim 1, wherein said primary unit includes a biasing mechanism.

5. The invention as described in claim 4, wherein said biasing mechanism is carried by said bracket.

6. The invention as described in claim 5, wherein said bracket includes a support wall [of the primary unit] and said pivot pin carried cantilever by said support wall.

7. The invention as described in claim 6, wherein said biasing mechanism includes a retainer bar carried cantilevered by the support wall at one end of said retainer bar; and a spring with a laterally coiled strand portion, the laterally coiled portion receiving said retainer bar within, and the retainer bar retaining a first strand end of the spring.

8. The invention as described in claim 1, wherein said drive unit comprises the drive mount, a coupler and a drive assembly for controlling displacement of the coupler.

9. The invention as described in claim 8, wherein the coupler slidably receives a portion of the lever at a position spaced from a pivot axis of the pivot pin on the primary unit.

10. The invention as described in claim 9, wherein said primary unit and said drive unit are aligned coaxially with a displacement path of the coupler.

11. The invention as described in claim 1, wherein said drive unit engages the primary unit support bracket.

12. The invention as described in claim 11, wherein said primary support bracket includes a mount that carries the drive mount for maintaining the coupler in engagement with the lever of the primary unit.

13. A method for modularizing a vehicle decklid hinge comprises:

installing a pair of hinge sets to a peripheral body structure defining an opening and a decklid for covering the opening, each hinge set comprising a primary unit having a support bracket including a mount engageable with the peripheral body structure, said support bracket also carrying a pivot pin cantilevered on said support bracket defining a pivot axis, and a lever pivotally mounted with said pin to the support bracket; and installing a secondary or drive unit having a drive mount for aligning a second pivot coaxial to the pivot pin axis of the primary unit, a coupler engaging the lever for rotation about the second pivot, and a drive mechanism for displacing the coupler coaxially about said pin and the second pivot.

14. The invention as described in claim 13, and comprising biasing said lever of said at least one primary unit with a biasing mechanism urging said lever to a pivoted position on said pivot pin.

15. The invention as described in claim 14, wherein said biasing includes a helically coiled strand, for biasing the lever to a supported position.

16. The invention as described in claim 13 comprising guiding said displacing at a position spaced from the pivot axis of said pin and said second pivot.

17. The invention as described in claim 16, wherein said guiding includes a track on said support plate.

18. A decklid hinge for displacably supporting a decklid to and between open and closed positions over an opening defined by peripheral vehicle body structure during and after movement between the positions comprises:

at least one hinge set, each said hinge set comprising a primary unit including;

a support bracket with a mount for securing said bracket of the peripheral vehicle body structure;

a pivot pin carried cantilevered by said support bracket, at one end of said pivot pin;

a linkage having a lever pivoted on said pivot pin and adapted to carry the decklid to and between said open and closed positions;

a drive unit with a drive mount including a support plate with a pivot having a second pivot axis and positioning said pivots coaxially as said support plate is interconnectable to at least one primary unit; and, at least one of said primary units including a biasing mechanism further comprising a drive unit with drive mount having a support plate with a second pivot having a second pivot axis and positioning the drive unit with coaxial alignment of said first and second pivots interconnectable to the primary unit.

* * * * *